United States Patent
Beutler

(10) Patent No.: US 9,315,081 B1
(45) Date of Patent: Apr. 19, 2016

(54) TRAILER TOW SKI SYSTEM

(71) Applicant: Innovative Fabricators, Inc., Watertown, SD (US)

(72) Inventor: Eric W. Beutler, Watertown, SD (US)

(73) Assignee: Innovative Fabricators, Inc., Watertown, SD (US)

( * ) Notice: Subject to any disclaimer, the term of this patent is extended or adjusted under 35 U.S.C. 154(b) by 0 days.

(21) Appl. No.: 14/879,295

(22) Filed: Oct. 9, 2015

(51) Int. Cl.
| | |
|---|---|
| *B62B 15/00* | (2006.01) |
| *B60D 1/24* | (2006.01) |
| *B60D 1/06* | (2006.01) |
| *B60D 1/52* | (2006.01) |
| *B60D 1/66* | (2006.01) |

(52) U.S. Cl.
  CPC ........ *B60D 1/247* (2013.01); *B60D 1/06* (2013.01); *B60D 1/52* (2013.01); *B60D 1/66* (2013.01)

(58) Field of Classification Search
  CPC .............. B60R 9/06; B60R 9/10; B60R 9/12; B60R 9/048; B60R 9/08; B60R 3/02; B60R 9/065; B60D 1/52; B60D 1/07
  See application file for complete search history.

(56) References Cited

U.S. PATENT DOCUMENTS

| | | | | |
|---|---|---|---|---|
| 4,052,079 A * | 10/1977 | Lehman | ............. | B62B 1/26 280/47.2 |
| 6,113,116 A * | 9/2000 | Stanton | ............. | B62B 13/06 280/24 |
| 6,224,083 B1 * | 5/2001 | Tyler | ............. | B60D 1/00 180/209 |
| 6,923,463 B1 * | 8/2005 | Ford | ............. | B60D 1/36 248/479 |

OTHER PUBLICATIONS http://www.smokeyhills.com/blog/booger-johnsons-ez-tow-skee/; Booger Johnson's EZ Tow Skee by Smokey Hills Outdoor Store; Received and Printed Oct. 8, 2015.
www.smokeyhills.com/blog/wp-content/uploads/sites/16/2014/12/useme.jpg; Picture of Booger Johnson's EZ Tow Skee by Smokey Hills Outdoor Store; Received & Printed Oct. 8, 2015.
http://dawhois.com/www/roaddogoutdoors.com.html; Big Foot Fish House and Trailer Skis from RoadDogOutdoors.com; Publication Date Jun. 8, 2011; Printed Oct. 8, 2015.

* cited by examiner

*Primary Examiner* — John Walters
*Assistant Examiner* — James Triggs
(74) *Attorney, Agent, or Firm* — Neustel Law Offices; Michael S. Neustel

(57) ABSTRACT

A trailer tow ski system for assisting in supporting the tongue weight of a trailer hitch during pulling of the trailer. The trailer tow ski system generally includes a ski member having a front lip extending upwardly, a support member extending upwardly from the ski member, a tongue member extending forwardly from the support member, a main coupler attached to the tongue member for removably connected to a ball of a vehicle hitch, a front support structure attached to a front portion of the ski member and to an upper portion of the support member, a rear support structure attached to a rear portion of the ski member and to the upper portion of the support member, and a hitch ball attached to the upper end of the support member. The hitch ball is removably coupled to a coupler of the trailer hitch to support the weight thereof.

20 Claims, 14 Drawing Sheets

TRAILER TOW SKI SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a trailer towing assistance device and more specifically it relates to a trailer tow ski system for assisting in supporting the weight of a trailer hitch during pulling of the trailer thereby removing all of the tongue weight from the towing vehicle.

2. Description of the Related Art

Any discussion of the related art throughout the specification should in no way be considered as an admission that such related art is widely known or forms part of common general knowledge in the field.

Trailer units have a trailer hitch that is removably connected to a motorized vehicle. One type of trailer unit is a fish house trailer (a.k.a. ice fishing trailer) used for ice fishing on ice during the winter. Conventional fish house trailers typically have two or four wheels to allow them to be pulled by the motorized vehicle to various locations on a lake or over land. Recently, fish house trailers have become increasingly larger in size and weight requiring larger motorized vehicles having larger suspensions to support the weight of the fish house trailer during moving of the fish house trailer. Some fish house trailers have lengths of 16 feet and have a gross weight of over 5,000 pounds with the weight increasing based on items placed in the fish house trailer by the end user.

While a large ¾ ton pickup truck may not have a problem moving most fish house trailers, a compact SUV, all-terrain vehicle (ATV; e.g. three-wheeler, four-wheeler) or utility task vehicle (UTV; a.k.a. side by side) will have difficulties because their suspensions are not designed to support the tongue weight of the trailer hitch of the fish house trailer. Therefore, as the size and weight of trailer units increases, the type of motorized vehicles capable of moving the trailer units decreases not because the motor sizes are insufficient but because the vehicle suspensions are not capable of supporting the tongue weight of the trailer hitch. It should be noted that even larger motorized vehicles can struggle to tow a larger trailer unit over snow or ice because of the combined increase tongue weight of the trailer hitch and the reduced traction to the wheels.

Because of the inherent problems with the related art, there is a need for a new and improved trailer tow ski system for assisting in supporting the weight of a trailer hitch during pulling of the trailer.

BRIEF SUMMARY OF THE INVENTION

Provided herein is a trailer towing assistance device which includes a ski member having a front lip extending upwardly, a support member extending upwardly from the ski member, a tongue member extending forwardly from the support member, a main coupler attached to the tongue member for removably connected to a ball of a vehicle hitch, a front support structure attached to a front portion of the ski member and to an upper portion of the support member, a rear support structure attached to a rear portion of the ski member and to the upper portion of the support member, and a hitch ball attached to the upper end of the support member. The hitch ball is removably coupled to a coupler of the trailer hitch to support the weight thereof.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
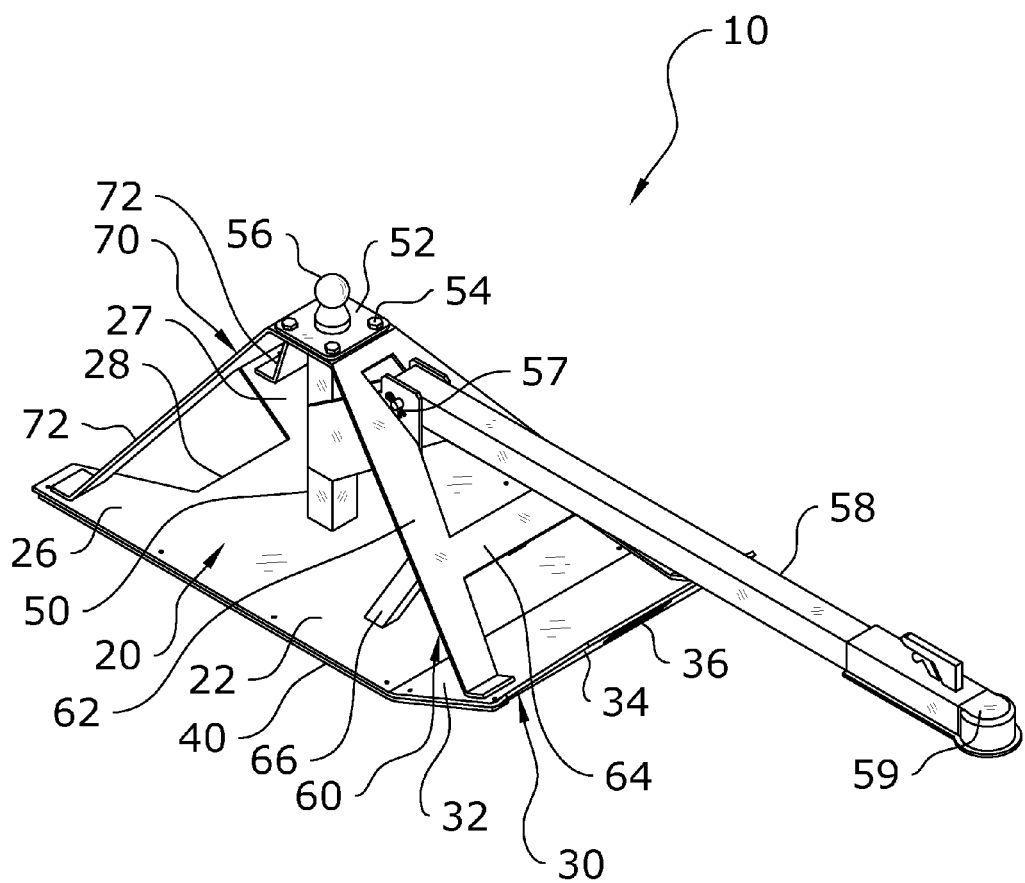
FIG. 1 is an upper perspective view of one embodiment of the present invention.

Turning now descriptively to the drawings, in which similar reference characters denote similar elements throughout the several views, FIGS. 1 through 13 illustrate a trailer tow ski system 10, which comprises a ski member 20 having a front lip 30 extending upwardly, a support member 50 extending upwardly from the ski member 20, a tongue member 58 extending forwardly from the support member 50, a main coupler 59 attached to the tongue member 58 for removably connected to a ball of a vehicle hitch 19, a front support structure 60 attached to a front portion of the ski member 20 and to an upper portion of the support member 50, a rear support structure 70 attached to a rear portion of the ski member 20 and to the upper portion of the support member 50, and a hitch ball 56 attached to the upper end of the support member 50. The hitch ball 56 is removably coupled to a coupler of the trailer hitch 14 to support the weight thereof. The entire structure of the trailer tow ski system 10 is preferably constructed of a metal material such as aluminum to provide a lightweight structure with the level of strength required to support larger trailer units 12.

Figure 3A:
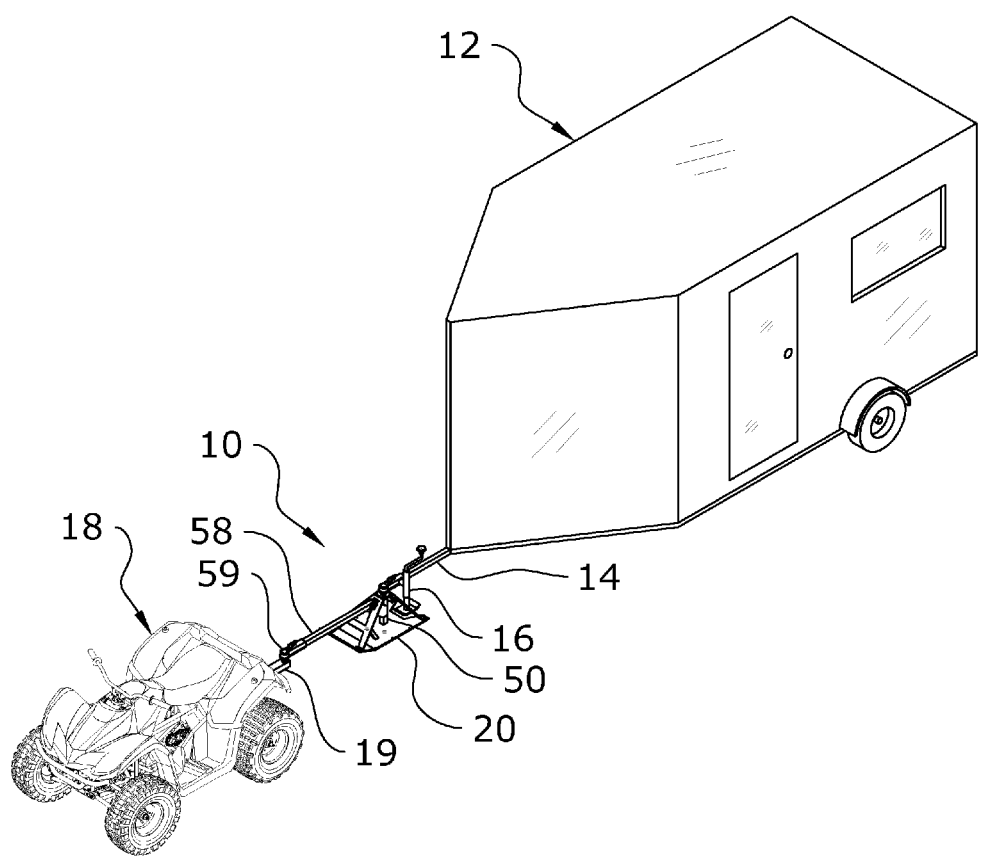
FIG. 3a is an upper perspective view of the present invention connected between a motorized vehicle and a trailer unit.
Figure 3B:
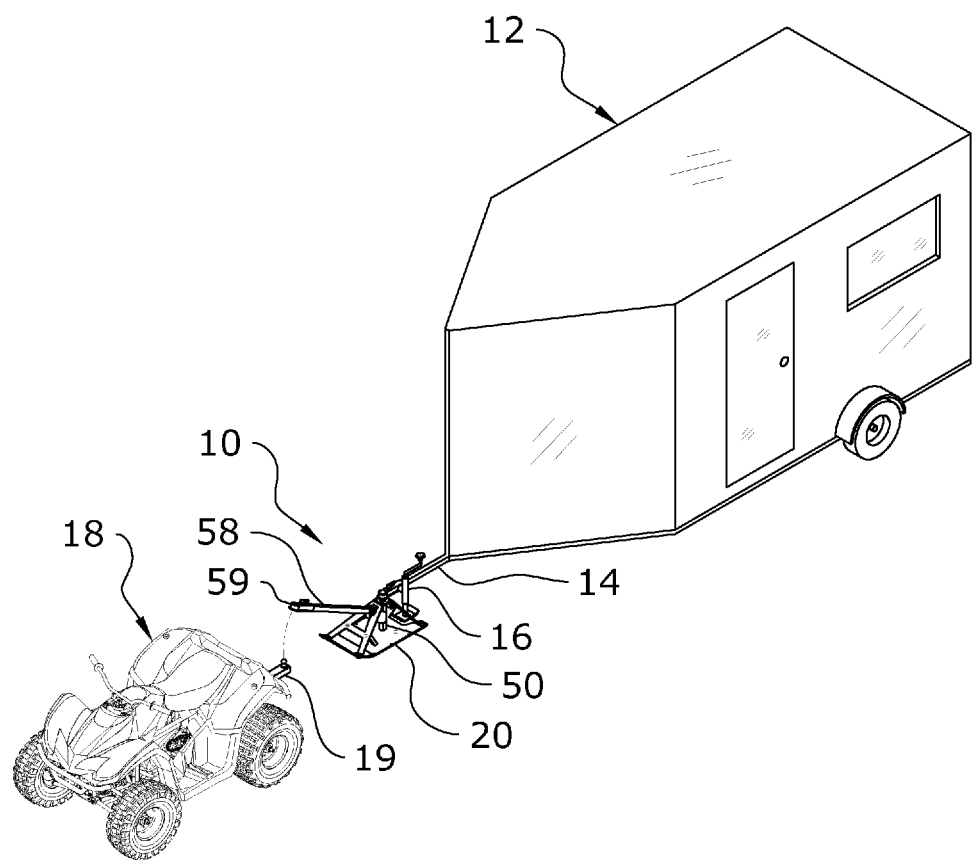
FIG. 3b is an upper perspective view of the present invention with the tongue member pivoted upwardly away from the vehicle hitch of the motorized vehicle.

The trailer tow ski system 10 is for supporting the tongue weight of a trailer hitch 14 for a trailer unit 12. The trailer unit 12 may be comprised of various types of trailers such as, but not limited to, a fish house trailer with two or more wheels with a trailer hitch 14 extending from the front as illustrated in FIGS. 3a and 3b of the drawings. The trailer unit 12 may be 16 feet or more in length (or less) and may weigh 5,000 lbs (or more or less). The present invention allows a motorized vehicle 18 having various types of suspensions to pull the trailer unit 12 regardless of the weight of the trailer unit 12 such as, but not limited to, an all-terrain vehicle (ATV) such as a four-wheeler, a utility task vehicle (UTV) such as a side by side, a compact sport utility vehicle (SUV), a car, a small pickup and the like.

B. Ski Member

FIGS. 1 through 13 illustrate the ski member 20 that is designed for passing over various types of surfaces such as ice and snow. The ski member 20 may be constructed of various types of material such as, but not limited to, plastic or aluminum.

The ski member 20 has an upper surface 22 and a lower surface 24 opposite of the upper surface 22. The lower surface 24 of the ski member 20 engages and slides over the surface such as ice or snow. The lower surface 24 is preferably a flat structure to reduce friction during usage.

The ski member 20 further includes a rear end and a front end opposite of the rear end. The ski member 20 also includes a main body and a front lip 30 extending forwardly and upwardly at an angle from the main body. The main body is preferably comprised of an elongated planar structure as illustrated in FIGS. 1, 2, 9, 10 and 11 of the drawings. The length and the width of the ski member 20 may vary depending upon the surface conditions to be used upon and the tongue weight of the trailer unit 12 to be supported. For example, the ski member 20 may be approximately 20 inches wide and approximately 41 inches in length. The ski member 20 is preferably constructed of a single sheet of aluminum having approximately a ¼ inch thickness.

Figure 2:
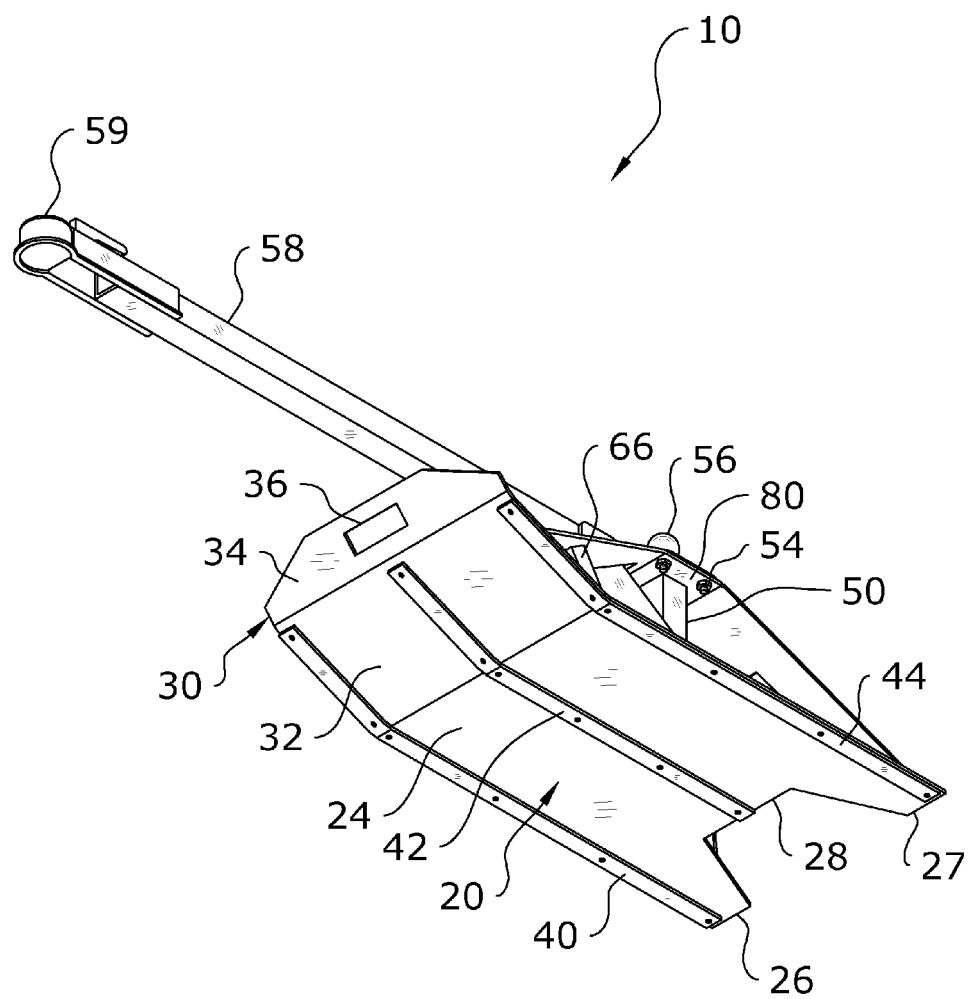
FIG. 2 is a lower perspective view of the present invention.
Figure 7:
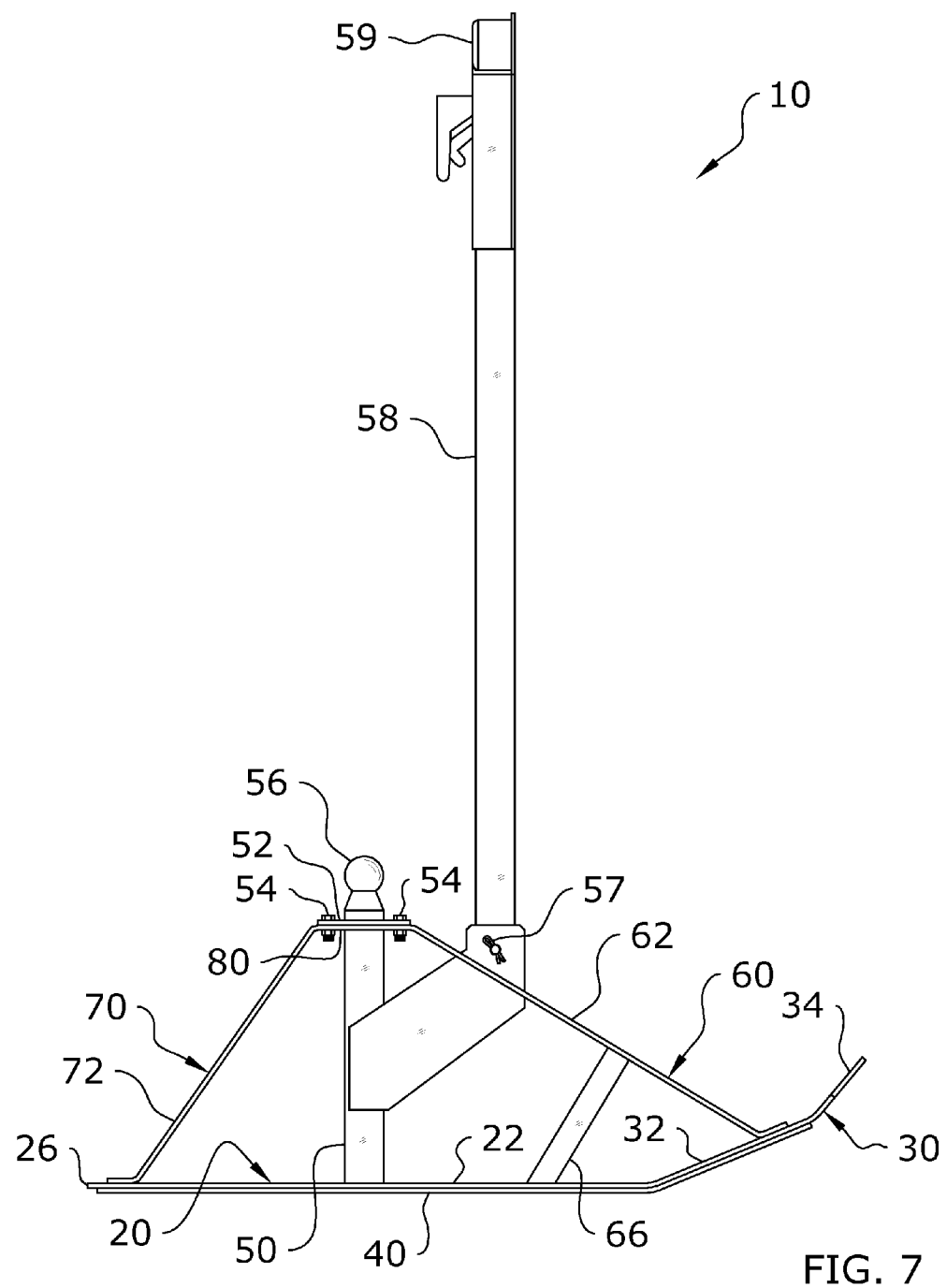
FIG. 7 is a right side view of the present invention.
Figure 8:
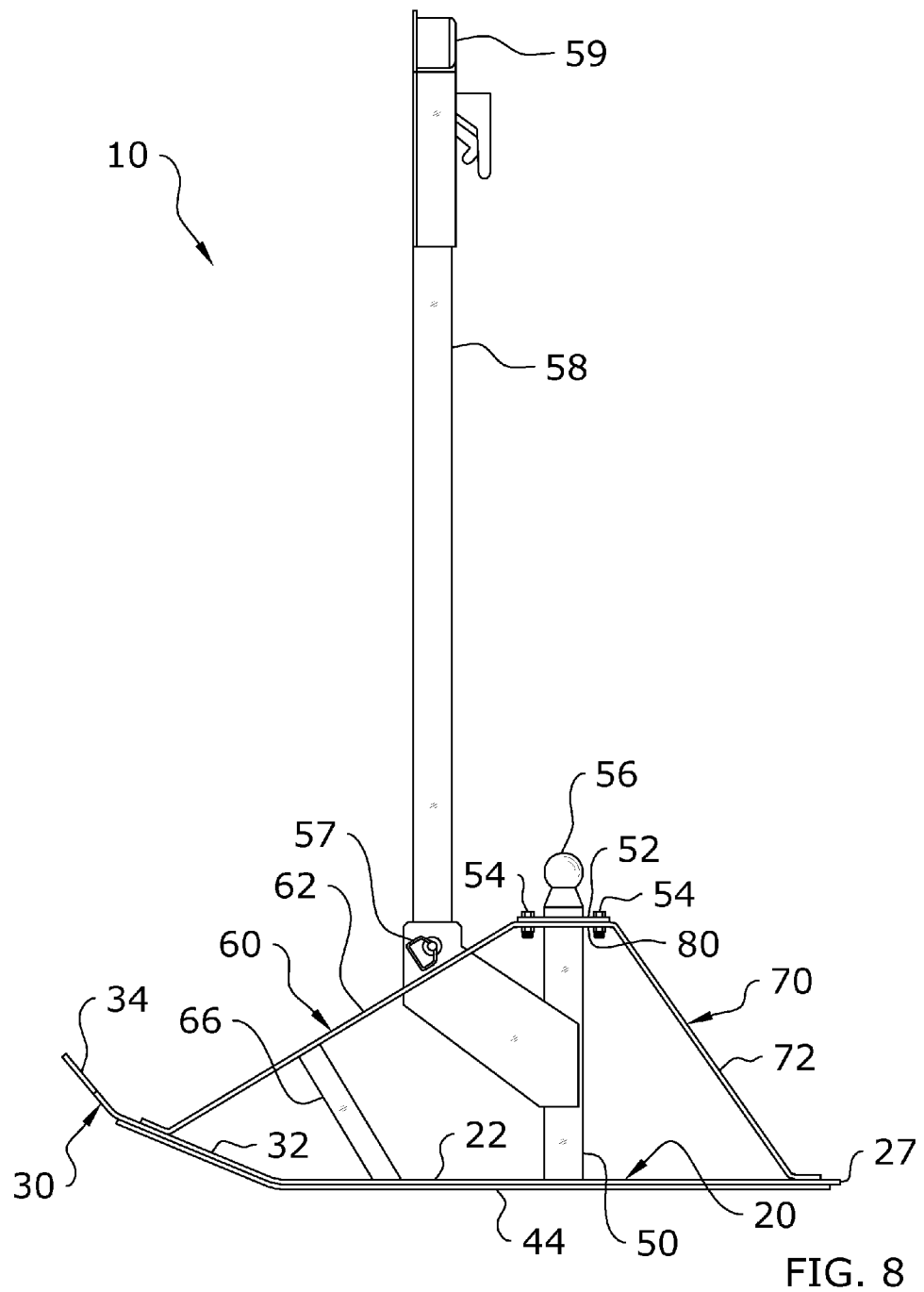
FIG. 8 is a left side view of the present invention.
Figure 9:
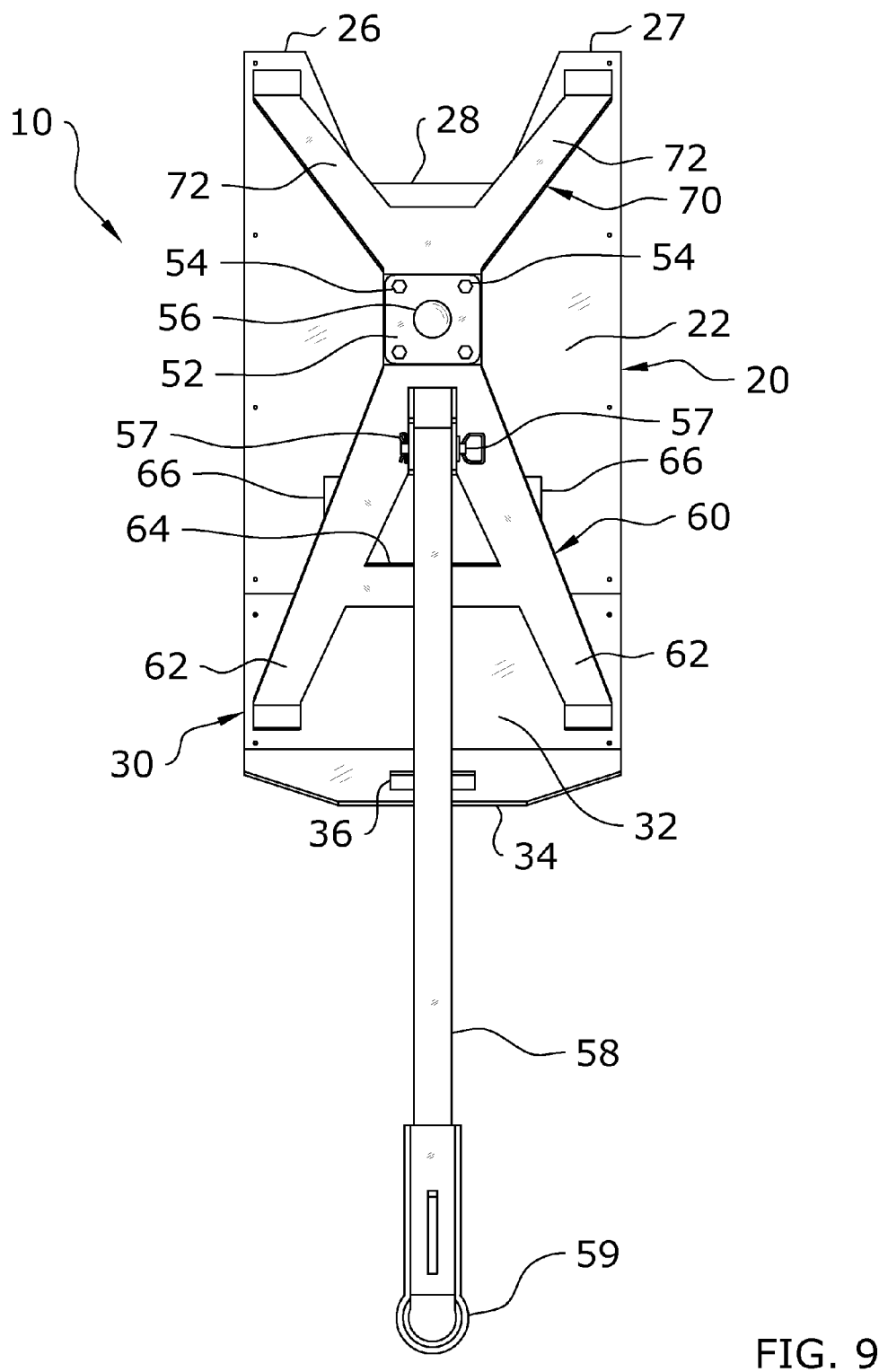
FIG. 9 is a top view of the present invention.
Figure 10:
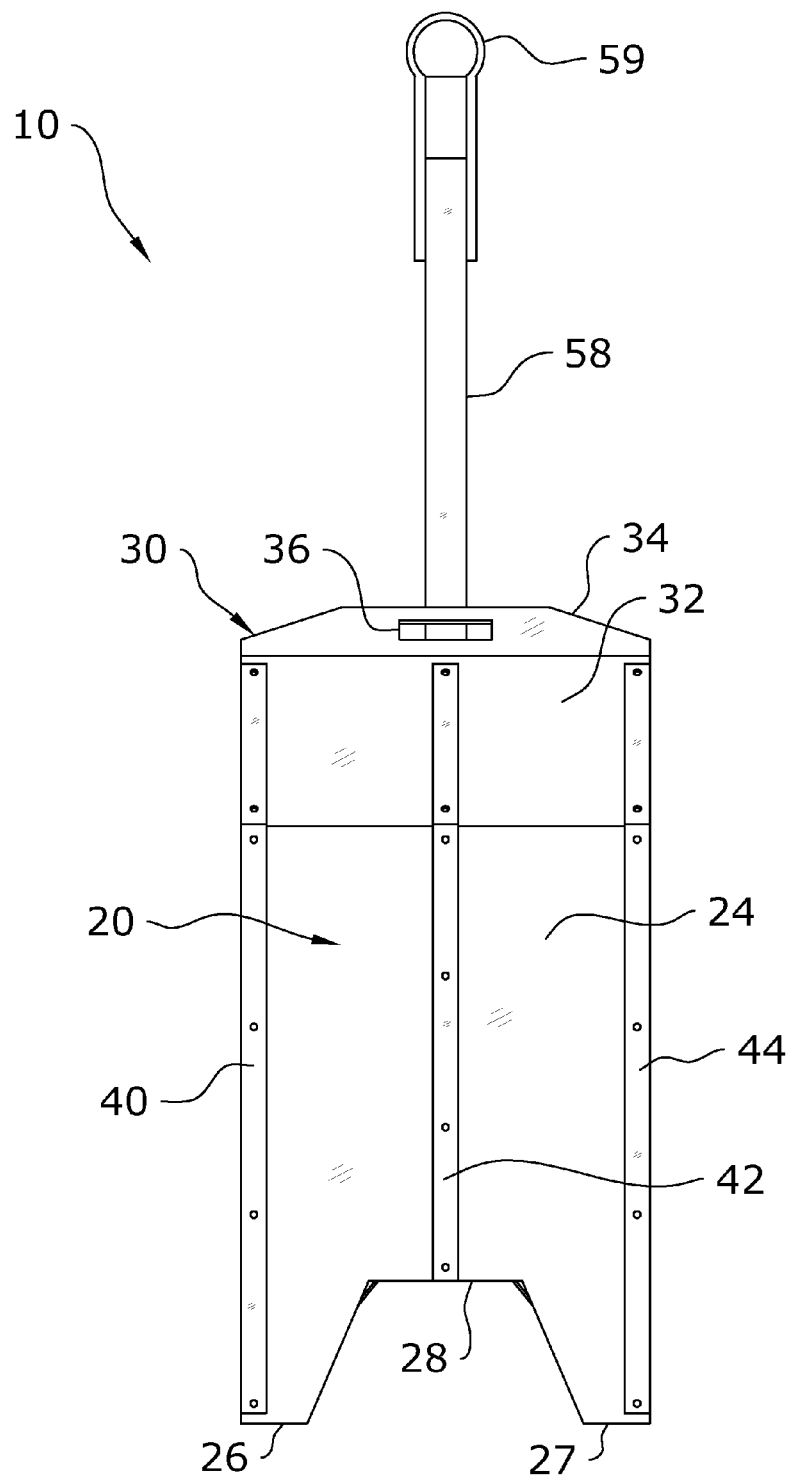
FIG. 10 is a bottom view of the present invention.

The front lip 30 includes a first portion 32 extending from the main body at a first angle with respect to horizontal and a second portion 34 extending from the first portion 32 at a second angle with respect to horizontal as best illustrated in FIGS. 2, 5, 7 through 12. The second angle is significantly greater than the first angle as best illustrated in FIGS. 7 and 8. The length of the first portion 32 is significantly greater than the second portion 34 as further shown in FIGS. 7 and 8 of the drawings. The front edge of the second portion 34 preferably tapers inwardly as best illustrated in FIGS. 2 and 10 of the drawings. The front lip 30 further includes a front opening 36 which a user can grasp with their hand to form a handle as illustrated in FIGS. 2 and 10 of the drawings.

One or more runners 40, 42, 44 are attached to the lower surface 24 of the ski member 20 as illustrated in FIGS. 2 and 10 of the drawings. The runners 40, 42, 44 are preferably comprised of a plastic material such as UHMW polyethylene. The runners 40, 42, 44 further include recessed openings that receive rivets, fasteners, or similar hardware that secure the runners 40, 42, 44 to the lower surface 24 of the ski member 20. The runners 40, 42, 44 preferably extend from near the rear edge of the ski member 20 to near the front edge of the ski member 20 as illustrated in FIGS. 2 and 10. The runners 40, 42, 44 preferably extend parallel with respect to the longitudinal axis of the ski member 20 to reduce the resistance of the ski member 20 and to assist in guiding the travel of the ski member 20 when being pulled by the motorized vehicle 18. The runners 40, 42, 44 may be comprised of a first runner 40 attached to the lower surface 24 near a first side of the ski member 20, a middle runner 42 attached to the lower surface 24 in a central location of the ski member 20 and a second runner 44 attached to the lower surface 24 near a second side of the ski member 20 opposite of the first side of the ski member 20 as shown in FIGS. 2 and 10 of the drawings.

C. Cutout

Figure 4:
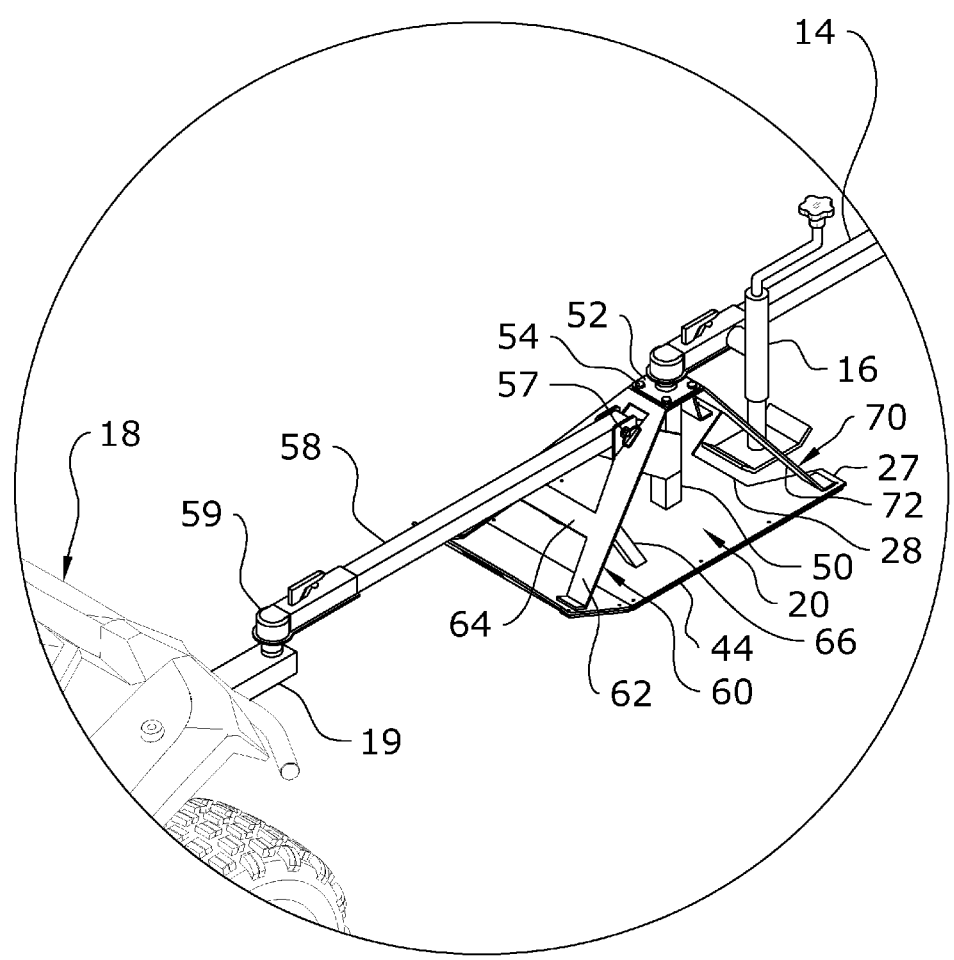
FIG. 4 is a magnified upper perspective view of the present invention connected between the motorized vehicle and the trailer unit.

The ski member 20 preferably includes a cutout 28 extending into the rear end of the ski member 20 to prevent engagement of the ski member 20 with a jack 16 of the trailer hitch 14 of the trailer unit 12 as illustrated in FIGS. 1 through 4, 9 and 10 of the drawings. The cutout 28 preferably extends forwardly a sufficient distance into the ski member 20 and has a shape sufficient to prevent engagement of the ski member 20 with a jack 16 of the trailer hitch 14 of the trailer unit 12. The cutout 28 is large enough to allow the jack 16 of the trailer hitch 14 to remain in a supporting position for the trailer hitch 14 to allow for convenient connection of the trailer tow ski system 10 to the coupler of the trailer hitch 14 as best illustrated in FIG. 4 of the drawings.

The ski member 20 includes a first extended portion 26 and a second extended portion 27 that extend rearwardly to define the cutout 28. The first extended portion 26 and the second extended portion 27 preferably taper inwardly as they extend rearwardly as best illustrated in FIG. 10 of drawings. The first extended portion 26 has a first inner edge and the second extended portion 27 has a second inner edge that faces the first inner edge. The first inner edge and the second inner edge preferably diverge rearwardly from one another as illustrated in FIG. 10 of the drawings. The ski member 20 includes a central edge positioned between the first inner edge and the second inner edge as best illustrated in FIG. 10 of the drawings. The central edge extends transverse with respect to a longitudinal axis of the ski member 20 forming a U-shaped cutout 28.

D. Support Member

The support member 50 extends upwardly from the upper surface 22 of the main body of the ski member 20 as illustrated in FIGS. 1, 4, 7 and 8 of the drawings. The support member 50 may be attached to the ski member 20 via various types of fastening devices (e.g. bolts) or welding. The support member 50 is positioned in a central rear portion of the upper surface 22 of the main body of the ski member 20 as illustrated in FIGS. 6 through 9 of the drawings. The support member 50 preferably extends upward in a vertical manner and is approximately 90 degrees with respect to the main body of the ski member 20. The support member 50 may be comprised of an aluminum tube have a rectangular cross section. The support member 50 may have various lengths that maintain the trailer unit 12 in a substantially level position when the trailer hitch 14 is connected to the hitch ball 56 such as approximately 15 inches.

E. Central Member

Figure 12:
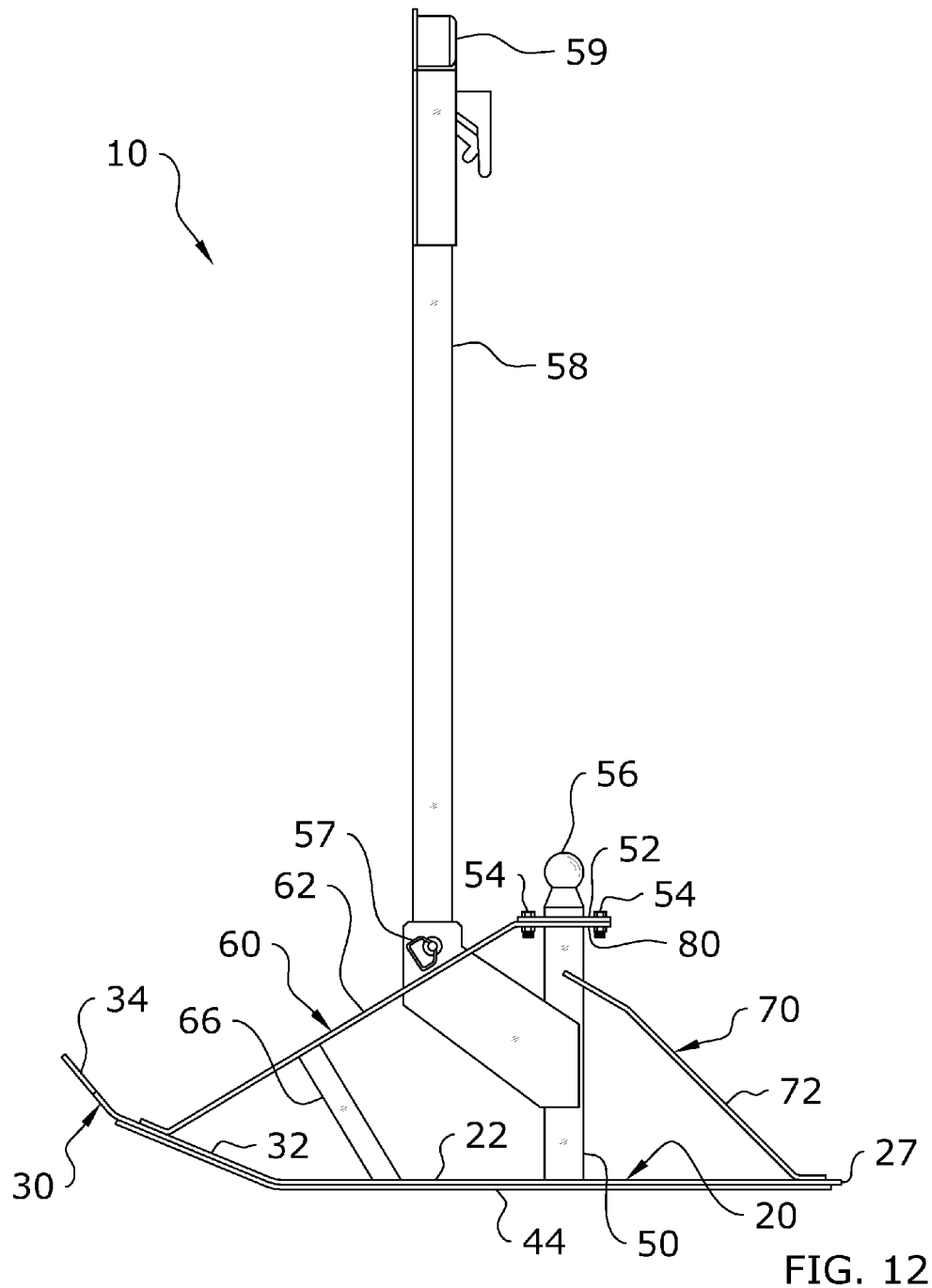
FIG. 12 is a left side view of the first alternative embodiment.

The central member 80 is attached to an upper end of the support member 50 as shown in FIGS. 7, 8 and 12 of the drawings. The central member 80 extends around the support member 50 or is attached to the upper end of the support member 50 via fastening devices or welding. The central member 80 may be a separate structure by itself or may be formed by welding end portions of the front support structure 60 and the rear support structure 70 together in a permanent connected manner. Alternatively, the front support structure 60, the central member 80 and the rear support structure 70 may be comprised of a single unitary sheet of metal folded in a manner to form the front support structure 60, the central member 80 and the rear support structure 70. The central member 80 is preferably parallel with respect to the upper surface 22 of the main body of the ski member 20 as shown in FIGS. 7 and 8.

F. Front and Rear Support Structures

The front support structure 60 is attached between a front portion of the ski member 20 and the central member 80. The front support structure 60 includes two or more front forks 62 attached to the ski member 20. FIGS. 1, 4 and 9 illustrate the front forks 62 of the front support structure 60 attached to the first portion 32 of the front lip 30. The front forks 62 may be attached to the ski member 20 with conventional fastening devices (e.g. bolts) or welding. A front cross member 64 extends between the front forks 62 as shown in FIG. 1 of the drawings. The front forks 62 and the front cross member 64 are preferably constructed of a unitary sheet of aluminum approximately ¼ inch thick. The front forks 62 taper inwardly towards the central member 80 as illustrated in FIG. 9 of the drawings. One or more front angled supports 66 extend upwardly from the main body of the ski member 20 to the front forks 62 to provide additional support as illustrated in FIGS. 7 and 8 of the drawings.

Figure 13:
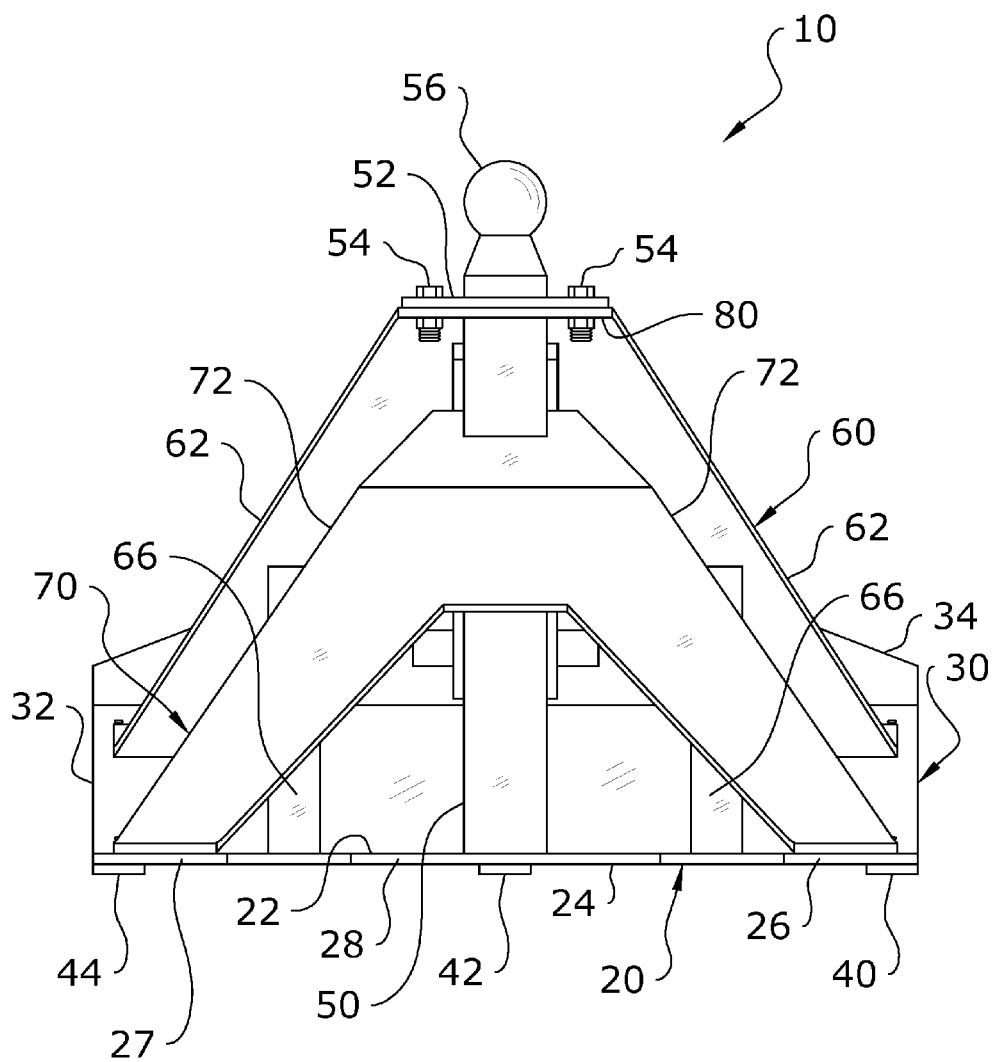
FIG. 13 is a rear view of the first alternative embodiment.

The rear support structure 70 attached to a rear portion of the ski member 20 and to the central member 80. The rear support structure 70 extends rearwardly and downwardly from the central member 80 and the front support structure 60 extends forwardly and downwardly from the central member 80. The rear support structure 70 includes two or more rear forks 72 attached to the ski member 20. FIGS. 1, 9 and 13 illustrate the rear forks 72 of the rear support structure 70 attached to the first extended portion 26 and second extended portion 27 of the ski member 20. The rear forks 72 may be attached to the ski member 20 with conventional fastening devices (e.g. bolts) or welding. The rear forks 72 are preferably constructed of a unitary sheet of aluminum approximately ¼ thick. The rear forks 72 taper inwardly towards the central member 80 and are connected to the central member 80 opposite of the front forks 62 as illustrated in FIG. 9 of the drawings.

Figure 11:
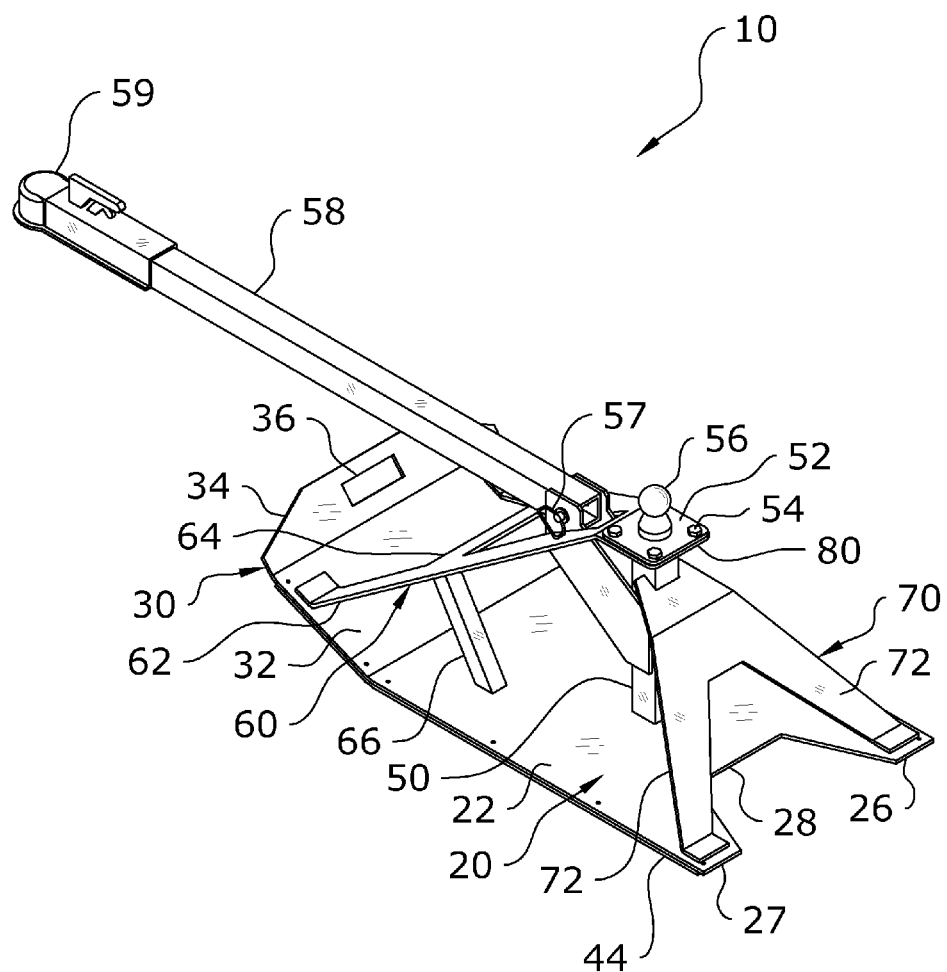
FIG. 11 is a rear upper perspective view of a first alternative embodiment of the present invention.

FIGS. 11 through 13 illustrate an alternative embodiment of the rear support structure 70 that connects to the support member 50 below the central member 80. The lower connection of the rear support structure 70 provides increased clearance for attachments to a trailer hitch 14 that may normally engage the rear support structure 70 shown in FIGS. 1 through 9. In the alternative embodiment, the rear support structure 70 is preferably attached to the support member 50 via welding, but conventional fastening devices may also be used.

The central member 80 is permanently connected to the front support structure 60 and the rear support structure 70. Furthermore, the central member 80 is comprised of both the front support structure 60 and the rear structure either being constructed from a single sheet of metal or welded together. The central member 80, the front support structure 60 and the rear support structure 70 are preferably constructed of approximately ¼ inch aluminum.

G. Hitch Ball

Figure 5:
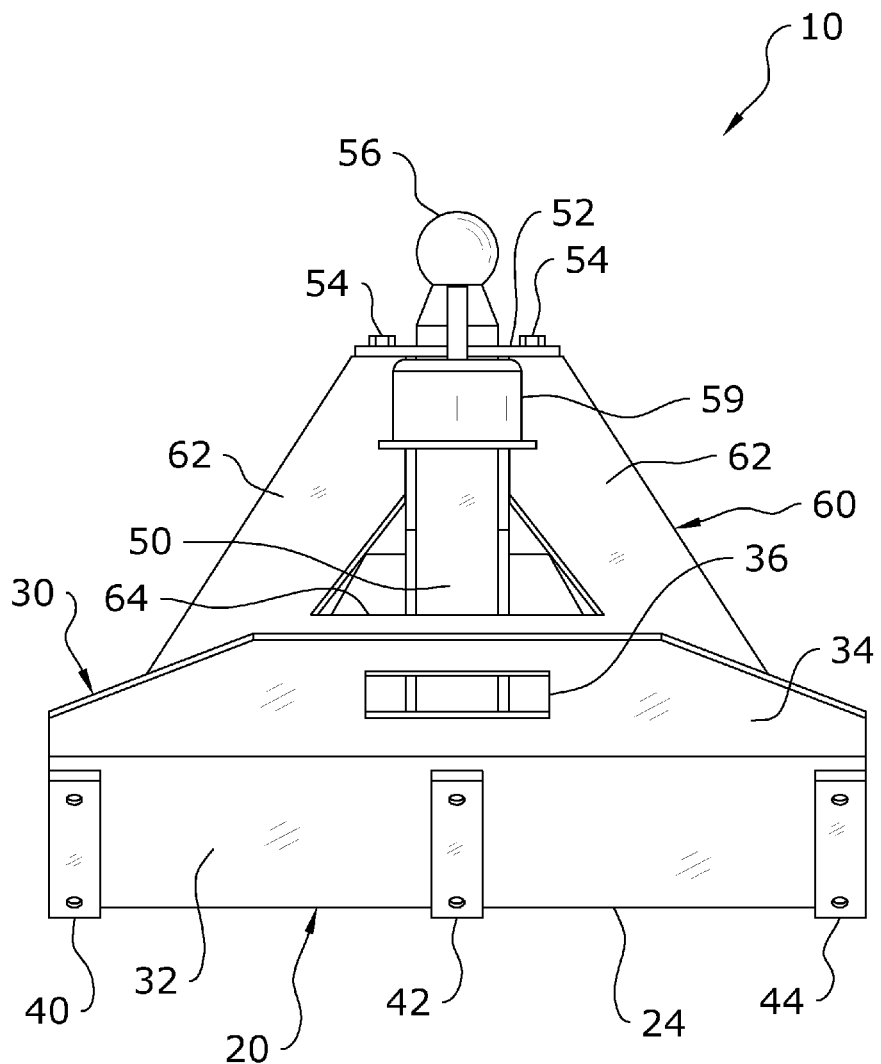
FIG. 5 is a front view of the present invention.
Figure 6:
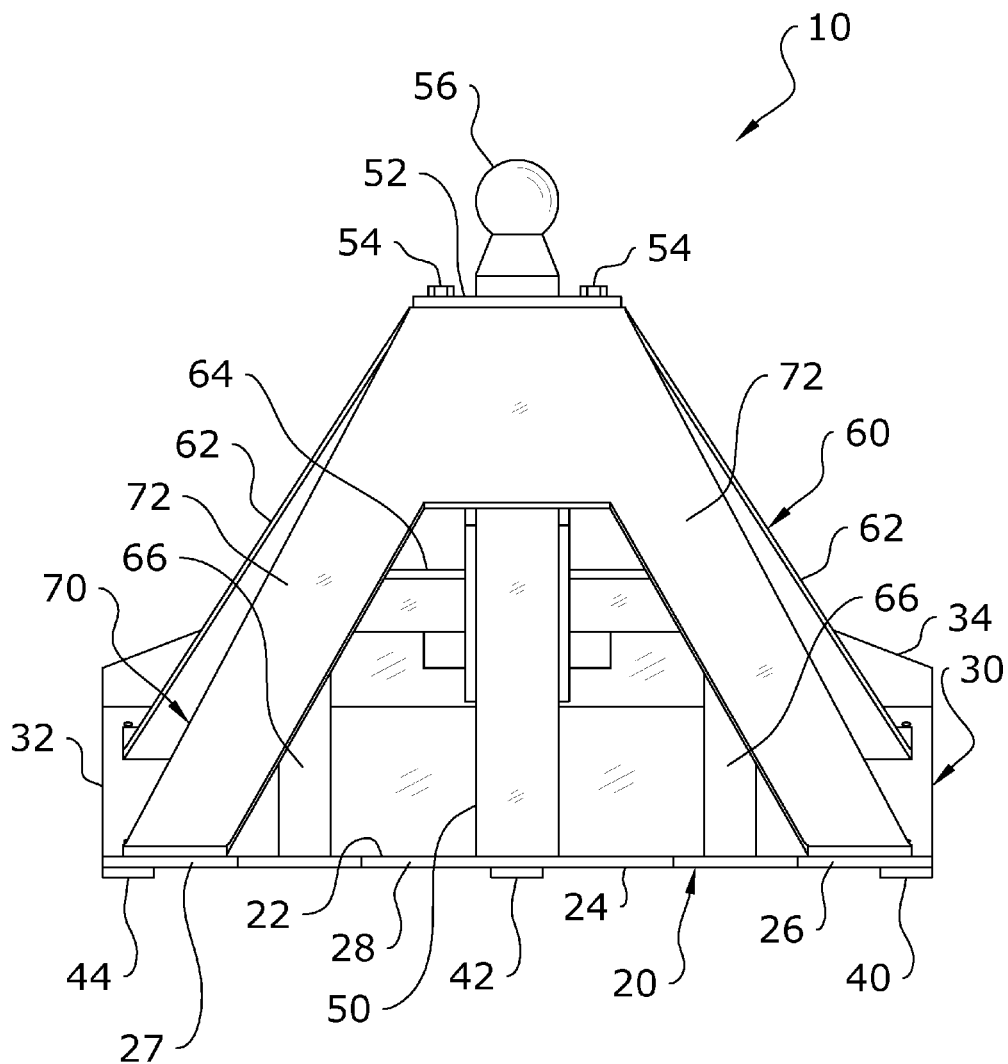
FIG. 6 is a rear view of the present invention.

The hitch ball 56 is comprised of any ball coupler used for connected to a trailer hitch 14. The hitch ball 56 is attached to a support plate 52 that is attached to the central member 80 by a plurality of fasteners 54 or welding. The support plate 52 is comprised of a plate having a plurality of apertures for the fasteners 54 to allow for removal of the support plate and the hitch ball 56 thereby replacing the hitch ball 56. The hitch ball 56 is adapted to be removably coupled to a coupler of the trailer hitch 14 of the trailer unit 12 to support the tongue weight of the trailer hitch 14. The hitch ball 56 is preferably concentrically aligned with the support member 50 as illustrated in FIGS. 5, 7 and 8 of the drawings. The hitch ball 56 may have various sizes such as, but not limited to, a 2 inch ball or a 2⁵⁄₁₆ inch ball for larger trailer.

H. Tongue Member

A tongue member 58 extends forwardly from the support member 50 for connecting to a vehicle hitch 19 of a motorized vehicle 18. The tongue member 58 is preferably pivotally connected and removably connected to the support member 50. A main coupler 59 is attached to the front end of the tongue member 58 for removably connecting to a ball of a vehicle hitch 19 for a motorized vehicle 18.

A pair of brackets (unnumbered) extend forwardly and upwardly from a central portion of the support member 50 and from opposite sides of the support member 50 as illustrated in FIGS. 1, 5, 7, 8 and 12. The pair of brackets extend through the opening defined by the front cross member 64 as illustrated in FIG. 1 of the drawings. The pair of brackets extend upwardly through the opening and have a hole extending through that receives a removable pin 57. The removable pin 57 is preferably comprised of a hitch pin having a broad end and a distal end having a hole that removably receives a clip member thereby allowing for pivoting of the tongue member 58 and easy removal of the tongue member 58 when not in use.

I. Operation of Preferred Embodiment

In use, the user positions the trailer tow ski system 10 so that the hitch ball 56 is directly aligned below the coupler of the trailer hitch 14 for the trailer unit 12 to be towed. The cutout 28 in the ski member 20 allows lower end of the jack 16 to remain firmly positioned on the support surface as illustrated in FIG. 4 of the drawings. The user then lowers the jack 16 which lowers the trailer hitch 14 upon the hitch ball 56 until all of the weight of the trailer hitch 14 is on the trail tow ski system 10. The user then folds up the jack 16 to avoid interference during towing. The user backs up the motorized vehicle 18 and connects the main coupler 59 of the tongue member 58 to the ball on the vehicle hitch 19 as shown in FIGS. 3a and 4 of the drawings. The user then uses the motorized vehicle 18 to pull the trailer unit 12 while the trailer tow ski system 10 supports the entire weight of the trailer hitch 14 and the motorized vehicle 18 merely has to provide the pulling forward to pull the trailer unit 12 on the support surface (e.g. snow, ice, land). The ski member 20 slides upon the support surface and also helps guide the direction of the motorized vehicle 18 and trailer unit 12 with the runners 40, 42, 44. When the new location for the trailer unit 12 is reached, the user disconnects the main coupler 59 from the vehicle hitch 19 and pivots the tongue member 58 upwardly as illustrated in FIG. 3*b* of the drawings. The user may remove the removable pin 57 to remove the tongue member 58 while keeping the present invention connected to the trailer unit 12. Alternatively, the user may reposition the jack 16 of the trailer hitch 14 to engage the support surface and lift the trailer hitch 14 upwardly away from the hitch ball 56 so the trailer tow ski system 10 may be removed and stored.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A trailer tow ski for supporting the tongue weight of a trailer hitch for a trailer unit, comprising:
   a ski member having an upper surface, a lower surface, a rear end, a front end, a main body and a front lip, wherein the front lip extends upwardly at an angle from the main body;
   a cutout extending into the rear end of the ski member to prevent engagement of the ski member with a jack of the trailer hitch of the trailer unit;
   a support member extending upwardly from the main body of the ski member;
   a tongue member extending forwardly from the support member;
   a main coupler attached to the tongue member for removably connecting to a ball of a vehicle hitch for a motorized vehicle; and
   a hitch ball attached to the upper end of the support member, wherein the hitch ball is adapted to be removably coupled to a coupler of the trailer hitch of the trailer unit to support the tongue weight of the trailer hitch.

2. The trailer tow ski of claim 1, wherein the ski member is constructed of aluminum.

3. The trailer tow ski of claim 1, wherein the main body is an elongated planar structure.

4. The trailer tow ski of claim 1, wherein the cutout is large enough to allow the jack of the trailer hitch to remain in a supporting position for the trailer hitch.

5. The trailer tow ski of claim 1, wherein the ski member includes a first extended portion and a second extended portion that extend rearwardly to define the cutout.

6. The trailer tow ski of claim 5, wherein the first extended portion has a first inner edge and the second extended portion has a second inner edge, wherein the first inner edge and the second inner edge diverge rearwardly from one another.

7. The trailer tow ski of claim 6, wherein the ski member includes a central edge positioned between the first inner edge and the second inner edge.

8. The trailer tow ski of claim 7, wherein the central edge extends transverse with respect to a longitudinal axis of the ski member.

9. The trailer tow ski of claim 1, wherein the trailer unit is comprised of a fish house trailer.

10. The trailer tow ski of claim 1, wherein the tongue member is pivotally and removably connected to the support member.

11. A trailer tow ski for supporting the tongue weight of a trailer hitch for a trailer unit, comprising:
    a ski member having an upper surface, a lower surface, a rear end, a front end, a main body and a front lip, wherein the front lip extends upwardly at an angle from the main body;
    a cutout extending into the rear end of the ski member to prevent engagement of the ski member with a jack of the trailer hitch of the trailer unit;
    a support member extending upwardly from the main body of the ski member;
    a tongue member pivotally extending forwardly from the support member;
    a main coupler attached to the tongue member for removably connecting to a ball of a vehicle hitch for a motorized vehicle;
    a central member attached to an upper end of the support member;
    a hitch ball attached to a support plate, wherein the support plate is attached to the central member by a plurality of fasteners, wherein the hitch ball is adapted to be removably coupled to a coupler of the trailer hitch of the trailer unit to support the tongue weight of the trailer hitch;
    a front support structure attached between a front portion of the ski member and the central member; and
    a rear support structure attached to a rear portion of the ski member and to the central member.

12. The trailer tow ski of claim 11, wherein the central member is permanently connected to the front support structure and the rear support structure.

13. The trailer tow ski of claim 11, wherein the main body is an elongated planar structure.

14. The trailer tow ski of claim 11, wherein the cutout is large enough to allow the jack of the trailer hitch to remain in a supporting position for the trailer hitch.

15. The trailer tow ski of claim 11, wherein the ski member includes a first extended portion and a second extended portion that extend rearwardly to define the cutout.

16. The trailer tow ski of claim 15, wherein the first extended portion has a first inner edge and the second extended portion has a second inner edge, wherein the first inner edge and the second inner edge diverge rearwardly from one another.

17. The trailer tow ski of claim 16, wherein the ski member includes a central edge positioned between the first inner edge and the second inner edge.

18. The trailer tow ski of claim 17, wherein the central edge extends transverse with respect to a longitudinal axis of the ski member.

19. The trailer tow ski of claim 11, wherein the trailer unit is comprised of a fish house trailer.

20. The trailer tow ski of claim 11, wherein the tongue member is removably connected to the support member by a removable pin.

* * * * *